May 14, 1929.  A. W. PATTON  1,712,518
SOLE LEATHER AND METHOD OF PRODUCING THE SAME
Filed Oct. 8, 1927
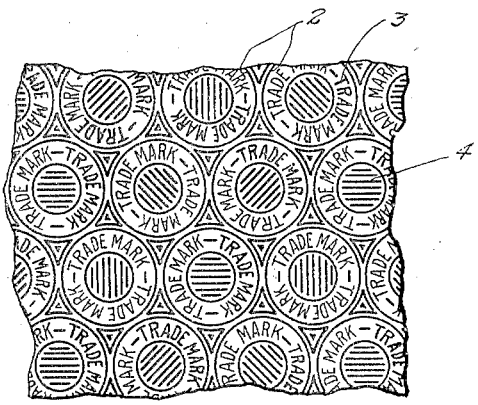
INVENTOR.
Ashley W. Patton
BY
Charles & French
ATTORNEYS Patented May 14, 1929.

1,712,518

UNITED STATES PATENT OFFICE.

ASHLEY W. PATTON, OF MILWAUKEE, WISCONSIN, ASSIGNOR TO THE DRISOLE TANNING COMPANY, INC., OF CUDAHY, WISCONSIN, A CORPORATION OF WISCONSIN.

SOLE LEATHER AND METHOD OF PRODUCING THE SAME.

Application filed October 3, 1927. Serial No. 224,975.

The invention relates to sole leather.

For many years sole leather has been furnished to the shoe manufacturer with a smooth surface grain side and owing to the fact that there are small imperfections in the grain, the manufacturer, in finishing the shoe, usually buffs the outer surface of the sole to remove these imperfections. This buffing operation is expensive and by providing sole leather in which the grain side is embossed throughout the greater portion of its area the buffing is eliminated, the leather is given a finished appearance and needs no subsequent finishing treatment by the manufacturer and the embossing actually compacts the outer surface of the leather and produces a more efficient tread surface. It has also been the practice for manufacturers of shoes to either stamp or brand their name or trade-name across the sole of the shoe after the sole had been buffed and finished. As the manufacturer of sole leather desires to create a market for his product he must provide some way of affixing this mark. Heretofore it has been customary for manufacturers of sole leather to cover the entire outer sole surface with a repetition of their name or trade-name in parallel lines or columns, but since in the cutting of a piece of sole leather the cutter must frequently place his sole-cutting die at various angles, the manufacturer's name or trade-name will appear at all sorts of angles in soles cut from the same piece. The object of this invention is to provide a piece of sole leather in which the embossing produces a uniform appearance no matter in what direction the sole is cut from the piece and in which the manufacturer's name or trade-name is so placed that it can be readily distinguished at any angle from which the sole is viewed, and to provide a method of producing the embossed product.

The drawing shows a portion of a piece of sole leather embodying the invention.

By the present invention the sole leather comes to the manufacturer with its outer surface completely finished so that it is not necessary for the manufacturer to do anything but cut out the soles therefrom and affix them to the shoes, since the embossing is done in such a way that no matter in what direction the sole die is placed upon the leather the embossed design, except for the marginal portion thereof, will always produce a uniform appearance and the manufacturer's name or trade-name will always be readily visible.

To accomplish this purpose the essential feature of the embossing is the provision of a plurality of circles, designated on the drawing by the numeral 2, that are arranged closely together and preferably substantially tangent to each other throughout the piece of leather. Within each of these circles a designating name 3, such as the trade-name or the manufacturer's name, is embossed so that it appears in different positions in adjacent circles with the result that no matter from what direction the sole is viewed and from what angle it is cut from the piece this name can be easily read.

As shown, the name 3 is arranged in an arc within the circle and this is the preferred arrangement, but it is obvious that it may be disposed therein in other ways. The remainder of the area within the circle may be embossed in various ways, such as by a plurality of straight lines 4, it being noted that these designs within the circle are oriented differently for adjacent circles so that the whole effect is to produce an embossed surface of uniform appearance no matter from what direction the sole is cut from the piece. As the greater surface of the leather is embossed in the manner above described, by a suitable die, the grain side or tread surface of the sole will be compacted and thus increase the wear-resisting qualities of the sole. Furthermore, the embossing operation has the effect of hiding any minor imperfections in the grain side of the leather, thereby increasing its cutting value. These imperfections have heretofore been removed by the separate and expensive step of buffing.

What I claim as my invention is:

1. As a new article of manufacture, a piece of sole leather having the greater portion of its grain side compacted by embossing, the embossing being carried out in a series of closely arranged juxtaposed circles with a design within each circle, the designs within adjacent circles having different axes of orientation whereby a sole cut from the leather at any angle will have an embossed design of uniform appearance.

2. As a new article of manufacture, a piece of sole leather having the greater portion of its grain side compacted by embossing, the embossing being carried out in a series of closely arranged juxtaposed circles with a designating name within each circle so arranged relative to that of an adjacent circle that the name may be easily read no matter from what direction the sole is cut from the leather.

3. The method of finishing a piece of sole leather so that soles may be cut therefrom and have their tread surface in a finished condition as cut which consists in embossing on the grain side of the leather a series of closely arranged juxtaposed designs whereby the sole may be cut from the piece at any angle and the embossed design will produce a uniform appearance in the finished sole.

4. The method of finishing a piece of sole leather so that the soles may be cut therefrom and have their tread surface in a finished condition as cut which consists in embossing on the grain side of the leather a series of closely arranged juxtaposed circles with a designating name and a design of adjacent circles being oriented differently whereby a sole cut from the piece at any angle will have an embossed design of uniform appearance and the designating name may be read no matter from what direction it is viewed.

In testimony whereof, I affix my signature.

ASHLEY W. PATTON.